(12) United States Patent
Manzara et al.

(10) Patent No.: US 8,288,005 B2
(45) Date of Patent: Oct. 16, 2012

(54) FLUOROPOLYMER COMPOSITIONS AND METHOD OF MAKING AND USING THEREOF

(75) Inventors: Anthony P. Manzara, Lake Elmo, MN (US); Yvan A. Bogaert, Godshuizenlaan Gent (BE); Michael D. Crandall, North Oaks, MN (US); Robert E. Eggers, Arden Hills, MN (US); Aron Y. Goodner, Bozeman, MT (US); Werner M. A. Grootaert, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/056,135

(22) PCT Filed: Apr. 16, 2009

(86) PCT No.: PCT/US2009/040756
§ 371 (c)(1),
(2), (4) Date: Jan. 27, 2011

(87) PCT Pub. No.: WO2010/014274
PCT Pub. Date: Feb. 4, 2010

(65) Prior Publication Data
US 2011/0135861 A1  Jun. 9, 2011

Related U.S. Application Data

(60) Provisional application No. 61/085,205, filed on Jul. 31, 2008.

(51) Int. Cl.
*B32B 27/00* (2006.01)
(52) U.S. Cl. .... 428/421; 428/36.9; 428/422; 428/36.92; 525/326.3; 525/376; 524/544
(58) Field of Classification Search ............... 428/36.9, 428/36.92, 421, 422; 525/326.3, 376; 524/544
See application file for complete search history.

(56) References Cited

U.S. PATENT DOCUMENTS

| | | | |
|---|---|---|---|
| 4,277,593 A | 7/1981 | Scheve | |
| 4,281,092 A | 7/1981 | Breazeale | |
| 4,882,390 A | 11/1989 | Kolb | |
| 4,983,680 A | 1/1991 | Ojakaar | |
| 5,268,405 A | 12/1993 | Ojakaar | |
| 5,399,758 A | 3/1995 | Miura | |
| 5,554,680 A | 9/1996 | Ojakaar | |
| 5,565,512 A | 10/1996 | Saito | |
| 5,565,650 A | 10/1996 | Johannessen | |
| 5,621,145 A | 4/1997 | Saito | |
| 5,681,904 A | 10/1997 | Manzara | |
| 5,700,879 A | 12/1997 | Yamamoto | |
| 5,767,204 A | 6/1998 | Iwa | |
| 6,281,296 B1 | 8/2001 | MacLachlan | |
| 6,365,693 B1 | 4/2002 | Hung | |
| 6,465,576 B1 | 10/2002 | Grootaert | |
| 6,657,013 B2 | 12/2003 | Grootaert | |
| 6,846,880 B2 * | 1/2005 | Grootaert et al. | 525/259 |
| 6,890,995 B2 | 5/2005 | Kolb | |
| 6,943,228 B2 | 9/2005 | Grootaert | |
| 7,294,677 B2 | 11/2007 | Grootaert | |
| 7,388,054 B2 | 6/2008 | Adair | |
| 7,795,355 B2 | 9/2010 | Matyjaszewski | |
| 2002/0049343 A1 | 4/2002 | Hung | |
| 2004/0024134 A1 | 2/2004 | Grootaert | |
| 2004/0138446 A1 | 7/2004 | Kharrat | |
| 2006/0276595 A1 | 12/2006 | Baran, Jr. | |
| 2008/0045585 A1 | 2/2008 | Farmer | |
| 2008/0103273 A1 | 5/2008 | Tang | |
| 2008/0108721 A1 * | 5/2008 | Ha et al. | 522/33 |
| 2010/0156840 A1 | 6/2010 | Frey | |

FOREIGN PATENT DOCUMENTS

| | | |
|---|---|---|
| EP | 0661304 | 7/1995 |
| EP | 0769521 | 4/1997 |
| EP | 0784064 | 7/1997 |
| GB | 2 073 756 | 10/1981 |
| WO | 82/00464 | 2/1982 |
| WO | 03/072033 | 9/2003 |
| WO | 2007/018431 | 2/2007 |
| WO | 2007/035296 | 3/2007 |
| WO | 2010/014274 | 2/2010 |
| WO | 01/05749 | 1/2011 |

OTHER PUBLICATIONS

Bertrand, G. and C. Wentrup, "Nitrile Imines: From Matrix Characterization to Stable Compounds," *Angewandte Chemie International English Edition*, vol. 33, Issue 5, (1994) pp. 527-545.
Billiet, "Combining 'Click' Chemistry and Step-Growth Polymerization for the Generation of Highly Functionalized Polyesters", Journal of Polymer Science: Part A: Polymer Chemistry, 2008, vol. 46, pp. 6552-656.
Canalle, "Copper-Free Clickable Coatings", Advanced Functional Materials, 2009, vol. 19, pp. 3464-3470. Darkow, âSynthesis, Photomodification and Characterization of Homo- and Copolymers with 2,5-bisaryltetrazolyl Pendant Groups, â*Reactive and Functional Polymers*, 1997, vol. 32, pp. 195-207.
Johnson, "Synthesis of Degradable Model Networks via ATRP and Click Chemistry", Journal of the American Chemical Society, Apr. 27, 2006, vol. 128, pp. 6564-6565.
International Search Report for PCT/US2009/040756, 4 pgs.
"Kalrez® Spectrum™ 6375", Product bulletin H-82112-01, Oct. 1999, 4 pgs.
Katritzky, âPreparation and Characterization of 1,2,3-Triazole-Cured Polymers from Endcapped Azides and Alkynesâ, Journal of Polymer Science: Part A: Polymer Chemistry, 2008, vol. 46, pp. 238-256.
Koshar, "Bis(perfluoroalkylsulfonyl)methanes and Related Disulfones", Journal of Organic Chemistry, 1973, vol. 38, No. 19, pp. 3358-3363.
Marshall, "Kalrez®-Type Perfluoroelastomers—Synthesis, Properties and Applications", in Modern Fluoropolymers, John Scheirs, editor, John Wiley & Sons Ltd., pp. 349-358 (1997).
Meldal, "Cu-Catalyzed Azide-Alkyne Cycloaddition", Chemical Reviews, Aug. 13, 2008, vol. 108, pp. 2952-3015.
Schiemenz, "Synthese von Aminoamiden über Gemischte Anhydride", Chem. Ber., 1959, vol. 92, pp. 857-862.
"Tecnoflon® PFR 95", Product bulletin, revised Feb. 2003, 13 pgs.

* cited by examiner

*Primary Examiner* — Michael C Miggins
(74) *Attorney, Agent, or Firm* — Julie A. Lapos-Kuchar

(57) ABSTRACT

Compositions having a fluoropolymer with a nitrile-containing cure site and at least a) a mono azide with at least one functional group in the beta position, or b) a polyazide, as a curing agent as well as methods and articles thereof are described. Articles of this disclosure are found to exhibit excellent chemical resistance and thermal stability.

18 Claims, No Drawings

US 8,288,005 B2

FLUOROPOLYMER COMPOSITIONS AND METHOD OF MAKING AND USING THEREOF

CROSS REFERENCE TO RELATED APPLICATIONS

This application is a national stage filing under 35 U.S.C. 371 of PCT/US2009/040756, filed Apr. 16, 2009, which claims priority to U.S. Provisional Application No. 61/085,205, filed Jul. 31, 2008, the disclosure of which is incorporated by reference in its/their entirety herein.

TECHNICAL FIELD

This disclosure relates to fluoropolymer compositions, methods of curing a fluoropolymer and articles thereof.

BACKGROUND

Fluoropolymers, i.e., polymers having a fluorinated backbone, have long been used in a variety of applications because of several desirable properties, including thermal stability.

Fluoroelastomers in particular, perfluoroelastomers, exhibit significant tolerance to high temperatures and harsh chemical environments. Various cure systems are known to cure perfluoroelastomers. See, for example, John B. Marshall, "Kalrez®-Type Perfluoroelastomers—Synthesis, Properties and Applications", in *Modern Fluoropolymers*, John Scheirs, editor, John Wiley & Sons Ltd., New York, (2000) p. 351-353. Nitrile containing perfluoroelastomers are typically cured by trimerizing the nitrile groups into triazine crosslinks using a variety of catalysts such as ammonia generating compounds like those described in U.S. Pat. No. 6,281,296, imidate catalysts such as those described in U.S. Pat. No. 6,657,013, amidine cure systems such as those described in U.S. Pat. No. 6,846,880, and fluoroonium cure systems such as those described in U.S. Pat. No. 7,294,677 and U.S. Pat. No. 6,890,995. The most notable cure systems for perfluoroelastomers are the peroxide cure systems, such as described in U.S. Pat. No. 4,983,680, U.S. Pat. No. 7,388,054, and U.S. Pat. No. 6,465,576, and the triazine forming cure systems.

The cure system selected can also influence the chemical resistance and thermal stability of the fluoroelastomer. For example, the most thermally stable perfluoroelastomers are cured with a triazine-forming cure system, but these perfluoroelastomers are known to have poor chemical resistance (e.g., volume swell) and are not recommended for use in hot aliphatic amines, ethylene oxide, propylene oxide, and hot water/steam applications. See, for example, John B. Marshall, "Kalrez®-Type Perfluoroelastomers—Synthesis, Properties and Applications", in *Modern Fluoropolymers*, John Scheirs, editor, John Wiley & Sons Ltd., New York, (2000) p. 351-352. On the other hand, perfluoroelastomers cured with peroxides in the presence of co-agents, such as triallyl isocyanurate, are traditionally known for their chemical resistance, but lack thermal stability. See, for example, John B. Marshall, "Kalrez®-Type Perfluoroelastomers—Synthesis, Properties and Applications", in *Modern Fluoropolymers*, John Scheirs, editor, John Wiley & Sons Ltd., New York, (2000) p. 351-352.

There has been a desire in the industry to develop a perfluoroelastomer composition that achieves both chemical resistance and thermal stability. The compositions, known in the art at the time of filing, which attempt to achieve both chemical resistance and thermal stability are O-rings sold under the trade designation "KALREZ SPECTRUM 6375", which are said to "give outstanding performance in the widest possible range of chemicals and temperatures" and polymer gum sold under the trade designation "TECNOFLON PFR 95", which offers "the broadest working temperature range and widest resistance to chemical media". See "KALREZ SPECTRUM 6375" product bulletin H-82112-01 printed October 1999, and "TECNOFLON PFR 95" product bulletin revised February 2003, respectively.

Another method to improve the performance of the perfluoroelastomer composition is to combine the triazine-forming and peroxide cure systems to take advantage of the chemical resistance of the peroxide cure and the high temperature resistance of the triazine-formed cure. However, there is a trade-off in the performance (i.e., the mixed cure system does not perform as well as or as poor as either cure system individually). Thus, one needs to determine the optimal ratio of triazine to peroxide curatives to balance the performance characteristics and ultimately the mixed-cure perfluoroelastomer composition has a performance somewhere in between the two cure systems individually. Thus far, it has not been possible to satisfy all the desired properties for a particular sealing application, which requires both high temperature performance and broad chemical resistance.

SUMMARY

In some embodiments, it is desirable to have a novel cure system.

In some embodiments, it is desirable to have a single cure system that satisfies the need for a combined high temperature performance and chemical resistance.

In some embodiments, it is desirable to provide a fluoropolymer composition with excellent chemical resistance to amines and steam and excellent thermal stability (i.e., low compression set when exposed to temperatures at or above 270° C., preferably as high as 300° C.).

Briefly, in one embodiment, the present disclosure provides a composition comprising a fluoropolymer having a nitrile-containing cure site and a curing agent selected from: a mono azide with at least one functional group in a beta position, a polyazide, or combinations thereof.

In another embodiment, the present disclosure provides a method of curing a fluoropolymer having a nitrile-containing cure site in the presence of a curing agent wherein the curing agent is selected from: a mono azide with at least one functional group in the beta position, a polyazide, or combinations thereof.

In yet another embodiment, the present disclosure provides an article prepared by curing a fluoropolymer having a nitrile-containing cure site in the presence of a curing agent wherein the curing agent is selected from: a mono azide with at least one functional group in the beta position, a polyazide, or combinations thereof.

The above summary is not intended to describe each embodiment. The details of one or more embodiments of the invention are also set forth in the description below. Other features, objects, and advantages will be apparent from the description and from the claims.

DETAILED DESCRIPTION

The compositions of this disclosure include fluoropolymer compositions and articles thereof and methods of making the same. It has been discovered that the fluoropolymer compositions made with the azide cure system have both excellent chemical resistance and excellent thermal stability.

As used herein, the term:

"beta position" refers to the position that is on the carbon atom adjacent to the azide-bearing carbon, i.e., the functional group is in the 2-position relative to the azide-bearing carbon;

"end-group" refers to the portion of the polymer where polymerization has initiated or terminated;

"fluoropolymer" refers to a polymer having a fluorine content of at least 30 percent by weight, based on the total weight of the fluoropolymer;

"nitrile-containing cure site" refers to a nitrile-containing group capable of participating in a cure;

"organic group" refers to a carbon-based group that is connected via a carbon atom, wherein the organic group may contain functional groups such as hydroxyl, amine, ammonium, ether, ester, urethane, azide, or other groups; and "a", "an", "the", and "at least one of" are used interchangeably and mean one or more.

Also herein, recitation of ranges by endpoints includes all numbers subsumed within that range (e.g., 1 to 10 includes 1.4, 1.9, 2.33, 5.75, 9.98, etc.).

Also herein, recitation of integer ranges by endpoints includes all integers subsumed within that range (e.g., 1 to 10 includes 1, 2, 3, 4, 5, etc.).

Azide compositions of this disclosure are selected from: a mono azide with at least one functional group in the beta position, a polyazide, or combinations thereof. Functional groups include: a group that does not interfere with the desired cure reaction and is connected via an oxygen atom or a nitrogen atom in the beta position (e.g., hydroxyl, deuterohydroxyl, urethane, amine, amine salt, or combinations thereof). The functional groups optionally may be fluorinated. Examples of functional groups include: —OH; —OD; —NR$_2$; —OCONHZ; —OCONDZ; —NY$_3^+$; or combinations thereof. R is independently H, D, or Z, where Z is an organic group that does not interfere with the reaction, such as a residue of an organic isocyanate comprising a hydrocarbon and/or fluorocarbon moiety that may contain an ether, an ester, an azide, a urethane, or other groups. Optionally, Z may be fluorinated. Y is independently an organic group that does not interfere with the reaction.

In one embodiment, the azide is of the formula:

$$UOCR_2CR_2N_3 \quad (1)$$

where U is H, D, or a urethane (—CO—NR$_2$) and R is independently H, D, or an organic group;

$$R'_2NCR_2CR_2N_3 \text{ or } A\text{-}R'_3N^+CR_2CR_2N_3 \quad (2)$$

where R' is an organic group connected via carbon and A is an anion (e.g., I—, Br—, Cl—, SO$_4^{-2}$, sulfonate, etc.);

$$G(N_3)_m \quad (3)$$

where m is an integer from 2 to about 10 and G is a m-valent organic group, where at least two of the azido (N$_3$) groups are connected via aliphatic carbon atoms, where G may contain other non-interfering organic groups such as hydroxyl, amine, ammonium, ether, ester, urethane, or other groups that do not interfere with the desired reaction; or combinations thereof, which may contain both kinds of beta-position groups (nitrogen connected and oxygen connected), or any mixture of curatives of formula (1) (2) and/or (3).

The azides of formulas (1) and (2) may be monofunctional. The azides of formulas (1), (2), and (3) may be polyfunctional (i.e., having more than one azido moiety).

Examples of compositions of formula (1) include, but are not limited to: DOCH$_2$CH$_2$N$_3$, HOCH$_2$CH$_2$N$_3$, C$_4$H$_9$NDCOOCH$_2$CH$_2$N$_3$, (CH$_3$)$_3$CNHCOOCH$_2$CH$_2$N$_3$, C$_6$H$_5$NHCOOCH$_2$CH$_2$N$_3$, C$_4$F$_9$OCFCF$_3$NDCOOCH$_2$CH$_2$N$_3$, N$_3$CH$_2$CH$_2$OCONH(CH$_2$)$_6$NHCOOCH$_2$CH$_2$N$_3$, CH$_3$OCH$_2$CHOHCH$_2$N$_3$, CH$_3$OCH$_2$CH(OCONHC$_4$H$_9$)CH$_2$N$_3$, N$_3$CH$_2$CH$_2$OCH$_2$CHOHCH$_2$N$_3$, N$_3$CH$_2$CH$_2$O[CH$_2$CH(CH$_2$N$_3$)O]$_6$H, CH$_3$CH$_2$C(CH$_2$OCH$_2$CHOHCH$_2$N$_3$)$_3$, C$_6$H$_5$NHCOOCH$_2$CH$_2$N$_3$, and C$_4$F$_9$OCFCF$_3$NDCOOCH$_2$CH$_2$N$_3$.

Examples of compositions of formula (2) include, but are not limited to (CH$_3$)$_3$CNHCOOCH$_2$CH$_2$N$_3$ and (CH$_3$)$_2$NCH$_2$CH$_2$N$_3$.

Examples of compositions of formula (3) include, but are not limited to: CH$_3$CH$_2$C[CH$_2$(OCH$_2$CH(CH$_2$N$_3$))$_2$OCOCH$_3$]$_3$ and CH$_3$CH$_2$C[CH$_2$(OCH$_2$CH(CH$_2$N$_3$))$_2$OH]$_3$.

In one embodiment of the azide cure system, a curing agent comprising an azido moiety is added to a fluoropolymer having a nitrile-containing cure site.

Fluoropolymers of this disclosure include: partially fluorinated plastic, perfluoroplastic, partially fluorinated elastomer, perfluoroelastomer, and combinations thereof. Suitable fluoropolymers include interpolymerized units derived from perfluorinated and partially fluorinated monomers. Suitable example monomers include: perfluoroolefins (e.g., tetrafluoroethylene and hexafluoropropylene), perfluorovinyl ethers (e.g., perfluoro alkyl vinyl ethers and perfluoroalkoxy vinyl ethers), and partially-fluorinated olefins (e.g., vinylidene fluoride or chlorotrifluoroethylene). The fluoropolymer may also include interpolymerized units derived from olefins (e.g., ethylene, propylene, and the like).

Suitable perfluorinated vinyl ethers include those of the formula:

$$CF_2\!=\!CFO(R'_fO)_a(R''_fO)_bR_f$$

where R'$_f$ and R''$_f$ are the same or are different linear or branched perfluoroalkylene groups of 1-6 carbon atoms; a and b are, independently, 0 or an integer from 1 to 10; and R$_f$ is a perfluoroalkyl group of 1-6 carbon atoms.

Perfluoroalkyl vinyl ethers may include compositions of the formula:

$$CF_2\!=\!CFO(CF_2CFXO)_nR_f$$

where X is F or CF$_3$; n is 0-5, and R$_f$ is a perfluoroalkyl group of 1-6 carbon atoms.

Perfluoroalkyl vinyl ethers are those where, in reference to either Formula 1 or 2 above, n is 0 or 1 and R$_f$ contains 1-3 carbon atoms. Examples of such perfluorinated ethers include perfluoromethyl vinyl ether, perfluoroethyl vinyl ether, and perfluoropropyl vinyl ether.

Other useful perfluorinated monomers include those compounds of the formula:

$$CF_2\!=\!CFO[CF_2]_q(CFZ)_uO]_nR_f$$

where R$_f$ is a perfluoroalkyl group having 1-6 carbon atoms, q is 0-2, u is 0 or 1, n is 0-5, provided that both q and n are not zero, and Z is F or CF$_3$. Members of this class may include those in which R$_f$ is CF$_3$ or C$_3$F$_7$, q is 0, and n is 1.

Additional perfluoroalkyl vinyl ether monomers useful in the invention include those of the formula:

$$CF_2\!=\!CFO[CF_2CF(CF_3)O]_g(CF_2)_k(OCF_2)_p]C_xF_{2x+1}$$

where g is 0 or an integer from 1-5, k is 0 or an integer from 1-6, p is 0-3, and x is 1-5, provided that when k is 0, p is also 0. Members of this class may include compounds where g is 0 or 1, k is 0 or 1, p is 0 or 1, and x is 1.

Perfluoroalkoxy vinyl ethers useful in the invention include those of the formula:

$$CF_2\!=\!CFO(CF_2)_t(CFZ)_uO(CF_2O)_wC_xF_{2x+1}$$

where Z is F or CF$_3$, t is 1-3, u is 0-1, w is 0-3, and x is 1-5, preferably 1. Specific, representative, examples of useful perfluoroalkoxy vinyl ethers include: CF$_2$=CFOCF$_2$OCF$_2$CF$_3$, CF$_2$=CFOCF$_2$OCF$_3$, CF$_2$=CFO(CF$_2$)$_3$OCF$_3$, and CF$_2$=CFOCF$_2$CF$_2$OCF$_3$.

Mixtures of perfluoroalkyl vinyl ethers and perfluoroalkoxy vinyl ethers may also be employed.

Perfluoroolefins useful in the invention include those of the formula:

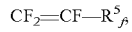

where R$^5_f$ is fluorine or a perfluoroalkyl of 1 to 8, or even 1 to 3, carbon atoms.

In addition, partially-fluorinated monomers or hydrogen-containing monomers such as olefins (e.g., ethylene, propylene, and the like), and vinylidene fluoride can be used in the fluoropolymer of the invention.

One example of a useful fluoropolymer is composed of tetrafluoroethylene and perfluoromethyl vinyl ether. In such copolymers, the copolymerized perfluorinated ether units constitute from about 15 to about 50 mole percent (mol %) or 30 to about 40 mol % of total monomer units present in the polymer.

An example of a useful fluoropolymer is one having an end group represented by at least one of the following: —CF$_3$, —CF$_2$H, —CFH$_2$, and —CH$_3$, and having an integrated absorbance ratio of carbonyl-containing end groups of the fluoropolymer gum less than 0.08, less than 0.06, less than 0.05, less than 0.025, or even less than 0.01 such as those disclosed in U.S. Prov. Appl. No. 61/032,269.

The carbonyl content of the fluoropolymer may be determined by an integrated absorbance ratio method based on Fourier transform infrared analysis (FTIR). Specifically, the total content of carboxyl, carboxylate, and carboxamide groups in the polymer is determined by measuring the integrated carbonyl absorbance (i.e., the total area of all peaks in the region 1620-1840 cm$^{-1}$) of thin polymer films using an FTIR spectrometer. In order to compare the carbonyl level in different polymer samples, integrated absorbance is normalized for differences in polymer film thickness by taking the ratio of the carbonyl integrated absorbance to the thickness band integrated absorbance. Thickness band integrated absorbance is the total area of all peaks in the region 2200-2740 cm$^{-1}$. The integrated absorbance of peaks in the latter region is proportional to the thickness of the polymer film. A peak height absorbance ratio method may also be used to determine the carboxyl, carboxylate, and carboxamide groups. This test relies on the baseline corrected integrated absorption underneath prominent peaks in the FTIR spectrum of a pressed film of the fluoropolymer. In particular, the integrated absorbance of the most prominent peaks between approximately 1620 cm$^{-1}$ to 1840 cm$^{-1}$ are measured. These peaks correspond to absorbances attributable to carbonyl moieties present in the polymer. This baseline corrected integrated absorbance under the most intense peaks within the range of 1620 cm$^{-1}$ and 1840 cm$^{-1}$ is divided by the baseline corrected integrated absorbance of the C—F stretch overtone between 2220 cm$^{-1}$ and 2740 cm$^{-1}$, which is indicative of the thickness of the sample. This gives the carbonyl absorbance ratio which characterizes the carboxyl, carboxylate, and carboxamide content of the polymer.

In another embodiment, the polymers useful in this disclosure have a fluoropolymer with low levels of carbonyl fluoride end groups. By low level, this means the amount of carbonyl fluoride groups in the fluoropolymer gum is less than 10%, less than 5% or even less than 1% when analyzed by FTIR (1830-1900 cm$^{-1}$). In another embodiment, the fluoropolymer is substantially free of carbonyl fluoride end groups, which means, the amount of carbonyl fluoride groups in the perfluoroelastomer gum is less than 0.5% when analyzed by FTIR. The carbonyl fluoride end groups may be determined using the FTIR methods described above, with the exception that the most prominent carbonyl fluoride peaks occur at approximately 1848 cm$^{-1}$ and 1884 cm$^{-1}$, which correspond to the carbonyl fluoride stretches, as is known in the art.

Nitrogen-containing cure site components enable a curing reaction of the fluoropolymer. The cure site component can be partially or fully fluorinated. Examples of monomers comprising nitrogen-containing groups useful in preparing fluoropolymers comprising a nitrogen-containing cure site include free-radically polymerizable nitriles.

Useful nitrile group-containing cure site monomers include nitrile-containing fluorinated olefins and nitrile-containing fluorinated vinyl ethers, such as: perfluoro(8-cyano-5-methyl-3,6-dioxa-1-octene); CF$_2$=CFO(CF$_2$)$_L$CN wherein L is an integer from 2 to 12; CF$_2$=CFO(CF$_2$)$_u$OCF(CF$_3$)CN wherein u is an integer from 2 to 6; CF$_2$=CFO[CF$_2$CF(CF$_3$)O]$_q$(CF$_2$O)$_y$CF(CF$_3$)CN or CF$_2$=CFO[CF$_2$CF(CF$_3$)O]$_q$(CF$_2$)$_y$OCF(CF$_3$)CN wherein q is an integer from 0 to 4 and y is an integer from 0 to 6; or CF$_2$=CF[OCF$_2$CF(CF$_3$)]$_r$O(CF$_2$)$_t$CN wherein r is 1 or 2, and t is an integer from 1 to 4; and derivatives and combinations of the foregoing.

The fluoropolymer must contain a sufficient quantity of nitrile functional groups which can act as cure sites for crosslinking reactions. Nitrile moieties may be introduced by use of a nitrile-containing cure site monomer, i.e., the nitrile moieties are introduced into the polymer during polymerization. However, other methods of introduction are also contemplated by this disclosure. Examples of a nitrile-containing cure site monomers include CF$_2$=CFOCF$_2$(CF$_2$)$_3$CF$_2$CN; CF$_2$=CFOCF$_2$CF(CF$_3$)OCF$_2$CF$_2$CN; or combinations thereof.

In addition, one or more other fluoropolymers (which may include one or more copolymers) may be blended with the fluoropolymer (which may comprise a copolymer) having interpolymerized units derived from a cure site monomer comprising a nitrile moiety. Such other fluoropolymers useful in a blend and/or copolymer include the entire array described above. The other fluoropolymer(s) may lack interpolymerized units derived from a cure site monomer comprising a nitrile moiety and/or may include reactive sites adapted to a selected curative system. For example, two different fluoropolymers, each having interpolymerized units derived from a cure site monomer comprising a nitrile group may be blended to provide the fluoropolymer with nitrile-containing cure sites.

The amount of nitrile-containing cure sites in a side chain position of the fluoropolymer generally is from about 0.05 to about 5 mole percent or even from about 0.1 to about 2 mole percent.

Poly azides, mono azides with a functional group in the beta position, or combinations thereof, may be added as a curing agent to the fluoropolymer comprising a nitrile-containing cure-site. The amount of moles of nitrile cure sites to moles of azido moiety generally is in a ratio between about 10:1 to 0.1:1.

Although not wanting to be bound by theory, it is believed that the azido moiety on the curing agent and nitrile moiety on the polymer initially form a tetrazole, which then further reacts during the cure.

When employing the azide cure systems described above, other curing agents may be added to the perfluoroelastomer gum to crosslink the fluoropolymer. Generally, an effective amount of curative, which may include more than one composition, is at least about 0.1 parts curative per hundred parts of the curable composition on a weight basis, more typically at least about 0.5 parts curative per hundred parts of the curable composition. On a weight basis, the effective amount of curative is typically below about 10 parts curative per hundred parts of the curable composition, more typically below about 5 parts curative per hundred parts of the curable composition, although higher and lower amounts of curative may also be used.

Another fluoropolymer may be included along with another curative, such as described below, to provide particular properties. For example, a fluoropolymer suitable for peroxide curing and a peroxide curative may be included to improve chemical stability. Such a blend may further enhance the thermal stability and the chemical stability of the resultant blend, and also may provide economic benefits.

The fluoropolymer compositions can include any of the adjuvants commonly employed in curable fluoropolymer formulations. The azide cure system may also include additional curative and optionally a coagent. For example, peroxide cure systems, triazine-forming cure systems and bisaminophenol cure systems may be used with the azide cure system.

One material often blended with a fluoropolymer composition as a part of the peroxide cure system is a coagent (sometimes also referred to as a co-curative) composed of a polyunsaturated compound that is capable of cooperating with the curative to provide a useful cure. These coagents can generally be added in an amount equal to between 0.1 and 10 parts per hundred parts fluoropolymer, preferably between 1 and 5 parts per hundred parts fluoropolymer. Examples of useful coagents include triallyl cyanurate; triallyl isocyanurate; tri(methylallyl isocyanurate; tris(diallylamine)-s-triazine; triallyl phosphite; N,N-diallyl acrylamide; hexaallyl phosphoramide; N,N,N',N'-tetraalkyl tetraphthalamide; N,N,N',N'-tetraallyl malonamide; trivinyl isocyanurate; 2,4,6-trivinyl methyltrisiloxane; and tri(5-norbornene-2-methylene)cyanurate. Particularly useful is triallyl isocyanurate (TAIC).

Other coagents that can be used with the peroxide curative include the bis-olefins disclosed in EP Pat. No. 0 661 304, EP Pat. No. 0 784 064, and EP Pat. No. 0 769 521.

The fluoropolymer compositions can also be cured by combining other types of curatives. Examples of such curatives include peroxides, aromatic amino compounds including aromatic amino phenols, bis-aminophenols (e.g., as described in U.S. Pat. No. 5,767,204 and U.S. Pat. No. 5,700,879), bis-amidrazones, bis-amidooximes (e.g., as described in U.S. Pat. No. 5,621,145), and ammonium salts (e.g., as described in U.S. Pat. No. 5,565,512). Organometallic compounds of arsenic, antimony and tin also can be used, for example as described in U.S. Pat. Nos. 4,281,092 and 5,554,680. Particular examples include allyl-, propargyl-, triphenylallenyl-, and tetraphenyltin and triphenyltin hydroxide. These additional curatives are preferably added to reach total curative amounts (azide cure system plus other curative(s)) from about 0.05 to 10 phr, more preferably 0.1 to 5 phr (parts per hundred rubber).

It may be advantageous to add one or more onium salts to the fluoropolymer compositions to obtain improved polymer properties. Examples of suitable onium salts are described in U.S. Pat. No. 4,882,390. Specific examples include triphenylbenzyl phosphonium chloride, tributyl alkyl phosphonium chloride, tributyl benzyl ammonium chloride, tetrabutyl ammonium bromide, and triarylsulfonium chloride. The phosphonium compounds are preferred.

One or more acid acceptors can also be added to the formulations, though, where the presence of extractable metallic compounds is undesirable (such as for semiconductor applications) the use of inorganic acid acceptors should be minimized, and preferably avoided altogether. Commonly used acid acceptors include, for example, zinc oxide, calcium hydroxide, calcium carbonate, magnesium oxide, etc. These compounds generally are used in the fluoropolymer formulation to bind any HF or other acids that might be generated at the high temperatures where fluoropolymers must function.

Additives such as stabilizers, plasticizers, lubricants, fillers, and processing aids typically utilized in fluoropolymer compounding may be incorporated into the compositions, provided they have adequate stability for the intended service conditions. In particular, low temperature performance can be enhanced by incorporation of perfluoropolyethers. See, for example, U.S. Pat. No. 5,268,405.

An organic or inorganic filler may be added to the compound to improve physical properties, such as tensile strength and modulus. Fillers include: carbon black; silica; or other mineral fillers such as hydrotalcite, or barium sulfate, and fluoropolymer fillers; and combinations thereof.

Carbon black fillers are typically also employed in fluoropolymers as a means to balance, elongation, hardness, abrasion resistance, conductivity, and processability of the compositions. Suitable examples include MT blacks (medium thermal black) designated N-991, N-990, N-908, and N-907; FEF N-550; and large particle size furnace blacks. When used, 1-70 phr (parts per hundred parts rubber) of large size particle black is generally sufficient.

In addition, fluoropolymer fillers may also be present in the composition. Generally from 1 to 50 phr fluoropolymer filler is used, preferably at least about 5 phr fluoropolymer filler is present. The fluoropolymer filler can be any finely divided, easily dispersed plastic fluoropolymer that is solid at the highest temperature utilized in fabrication and curing of the perfluoroelastomer composition. By solid, it is meant that the fluoroplastic, if partially crystalline, will have a crystalline melting temperature above the processing temperature(s) of the fluoroelastomer(s). Such finely divided, easily dispersed fluoroplastics are commonly called micropowders or fluoroadditives. Micropowders are ordinarily partially crystalline polymers.

Micropowders that can be used in the composition of this disclosure can include, but are not limited to, those based on the group of polymers known as TFE polymers. This group includes homopolymers of TFE (PTFE) and copolymers of TFE with such small concentrations of at least one copolymerizable modifying monomer that the resins remain non-melt fabricable (modified PTFE). The modifying monomer can be, for example, HFP, perfluoro(propyl vinyl)ether, perfluorobutyl ethylene, chlorotrifluoroethylene or another monomer that introduces side groups into the polymer molecule. The concentration of such copolymerized modifiers in the polymer is usually less than 5 mole %. The PTFE and modified PTFE resins that can be used in this invention include both those derived from suspension polymerization and emulsion polymerization.

Such fillers typically have melting points ranging from 100 to 300° C. Examples of useful fillers include low molecular weight polytetrafluoroethylene (PTFE), tetrafluoroethylene-perfluoropropyl vinyl ether copolymer (PFA), and tetrafluoroethylene-hexafluoropropene copolymer (FEP).

If blends of fluoropolymers are desired, one useful route of incorporation is typically through blending the fluoropolymer latices in the selected ratio, followed by coagulation and drying.

The curable composition can typically be prepared by mixing one or more fluoropolymer(s), the curing agent, any selected additive or additives, any additional curatives (if desired), and any other adjuvants (if desired) in conventional processing equipment. The desired amounts of compounding ingredients and other conventional adjuvants or ingredients can be added to the curable composition and intimately admixed or compounded therewith by employing any of the conventional mixing devices such as internal mixers, (e.g., Banbury mixers), two roll mills, or any other convenient mixing device. The temperature of the mixture during the mixing process typically is kept safely below the curing temperature of the composition. Thus, the temperature typically should not rise above about 120° C. During mixing, it generally is desirable to distribute the components and adjuvants uniformly throughout the gum.

Molding or press curing of a fluoroelastomer gum mixture is typically conducted at a temperature sufficient to cure the mixture in a desired time under a suitable pressure. Generally this is between 95° C. and 230° C., or 150° C. and 205° C. for a period of time from 1 min to 15 hrs or 5 min to 30 min. A pressure of between 700 kPa and 21,000 kPa is usually imposed on the mixture in a mold.

The mixture is then processed and shaped, for example, by extrusion (for example, in the shape of a hose or hose lining) or molding (for example, in the form of an O-ring seal). The shaped article can then be heated to cure the composition and form a cured article.

The molded mixture or press-cured article may then, optionally be post-cured (e.g., in the oven) at a temperature and for a time sufficient to complete the curing, usually between 150° C. and 300° C. or 230° C. for a period from 2 hr to 50 hrs or more generally increasing with the cross-sectional thickness of the article. For thick sections, the temperature during the post-cure is usually raised gradually from the lower limit of the range to the desired maximum temperature. The maximum temperature used is preferably about 300° C. and this value is held for 4 hrs or more. This post-cure step generally completes the cross-linking and may also release residual volatiles from the cured compositions. Finally, the press-cured articles are returned to ambient temperature such as by shutting off the oven.

Articles of the present disclosure have shown both thermal stability and chemical resistance. Thermal stability is the ability of the fluoropolymer to respond to compression. Articles of this disclosure may have a compression set resistance of less than 75%, less than 70%, less than 65%, less than 60%, or even less than 50% when tested at 300° C. for 70 hours. Chemical resistance properties of fluoropolymers are typically tested with water, steam, and ethylene diamine. Articles of this disclosure may have a resistance to steam of less than 60%, or even less than 50% volume swell when tested at 230° C. for 168 hours. Articles of this disclosure may have a resistance to water of less than 80%, less than 50%, less than 40%, or even less than 30% volume swell when tested at 230° C. for 168 hours. Articles of this disclosure may have a resistance to ethylene diamine of less than 50%, less than 45% or even less than 40% volume swell when tested at 100° C. for 168 hours.

The fluoropolymer compositions are useful in production of articles such as O-rings, gaskets, tubing, and seals. Such articles are produced by molding a compounded formulation of the fluoropolymer composition with various additives under pressure, curing the part, and then optionally subjecting the part to a post-cure cycle. The curable compositions formulated without inorganic acid acceptors are particularly useful for applications such as seals and gaskets for manufacturing semiconductor devices, and in seals for high temperature automotive uses.

Advantages and embodiments of this invention are further illustrated by the following examples, but the particular materials and amounts thereof recited in these examples, as well as other conditions and details, should not be construed to unduly limit this invention. All materials are commercially available or known to those skilled in the art unless otherwise stated or apparent.

EXAMPLES

The preparation, of the fluoropolymer compositions of this disclosure are further described in the following examples. The particular materials and amounts thereof recited in these examples, as well as other conditions and details, should not be construed to unduly limit this invention. In these examples, all percentages, proportions and ratios are by weight unless otherwise indicated.

These abbreviations are used in the following examples: g=grams, min=minutes, mol=mole; mmol=millimole, hr=hour, mL=milliliter, L=liter, FTIR=Fourier transform infrared spectroscopy, and FT-NMR=Fourier transform nuclear magnetic resonance.

Test Methods

Cure rheology: Cure rheology tests were run on uncured, compounded samples using a Moving Die Rheometer (MDR) (Model 2000, Monsanto, St. Louis, Mo.) as described in ASTM D 5289-93a at 177° C. or 188° C., no-pre-heat, 30 min elapsed time or longer if needed to obtain t'90 and a 0.5 degree arc. Both the minimum torque ($M_L$) and highest torque attained during a specified period of time when no plateau or maximum torque was obtained ($M_H$) were measured. Also measured were the time for the torque to increase 2 units above $M_L$ ("ts2"), the time for the torque to reach a value equal to $M_L+0.5(M_H-M_L)$ ("t'50"), and the time for the torque to reach a value equal to $M_L+0.9(M_H-M_L)$ ("t'90").

For thermal stability and chemical resistance testing, compounded material was formed into either a coupon or an O-ring and cured. The coupons were 15 mm×40 mm×2 mm thick. The O-rings were 25 mm internal diameter with a 3.53 mm cross sectional area.

Compression Set: The samples were tested at 300° C. for 70 hrs as described in ASTM D 1414-94 with the exception that no lubricant was used.

Steam and water resistance: The samples were tested at 168 hrs at 230° C. as described in ASTM D-471-06 with the following exceptions. The samples were not dipped in alcohol or acetone. Also, the samples were placed in a 2 L stainless steel Parr pressure vessel containing 750 mL of deionized water. For water resistance, the samples were fully immersed in the water. For steam resistance, the samples were suspended above the water. The pressure vessel was then placed in a circulating air oven for 168 hrs at 230° C. After 168 hrs, the pressure vessel was quench-cooled in cold water back to room temperature and within a half hour of removal from the pressure vessel, the samples were weighed.

Ethylene diamine resistance: The samples were tested at 168 hrs at 100° C. as described in ASTM D-471-06 with the following exceptions. The samples were not dipped in alcohol or acetone. Also, the samples were placed in a 1 L resin flask with a water cooled condenser containing 500 ml of ethylene diamine. The specimens were fully immersed in the ethylene diamine for 168 hours at 100° C. A heating mantel was used to heat the resin flask. After 168 hrs the specimens were removed from the resin flask and rinsed in cold water. The samples were weighed within a half hour of removal from the flask.

Materials

| | |
|---|---|
| Bis tetrabutyl phosphonium perfluoroadipate | Prepared as described in U.S. Pat. No. 6,890,995. |
| Carbon black | N990, Cabot Corp., Alpharetta, GA |
| 2,5-Dimethyl-2,5-di(t-butylperoxy)-hexane | Obtained under the tradename "VAROX DBPH-50" from R. T. Vanderbilt, Norwalk, CT |
| TAIC DLC | Triallyl isocyanurate dry liquid concentrate (75% active) from Harwick Standard Distribution Center, Akron, OH |
| Hydrotalcite | Obtained from Kyowa Chemical Industry Co., Ltd., Kagawa, Japan |
| Aerosil | Obtained under the trade designation "AEROSIL R975" from Evonik Industries, Parsipanny, NJ |
| TAS | Tetra allyl silane obtained from 3M Co., St. Paul, MN |

Polymer gum A: Under oxygen-free conditions, a 150-L kettle was charged with 105 L deionized water. To the kettle, 520 g $C_7F_{15}COONH_4$ (APFO), 203 g $C_4F_9SO_2NH_4$, and 73 g $NH_4Cl$ were added. After heating to 65° C., 2000 g tetrafluoroethene (TFE) and 5820 g perfluoromethylvinyl ether (PMVE) were added. MV5CN (140 g) was added as preemulsion (as described in U.S. Publ. No. 2004/0024134). The reaction was initiated with addition of 155 g ammonium peroxodisulphate (APS) dissolved in 1400 mL deionized water. At 14 bar pressure and 65° C., 24.5 kg TFE, 20.4 kg PMVE, and 1.7 kg $CF_2$=$CFOCF_2(CF_2)_3CF_2CN$ (MV5CN) (added as a preemulsion as described in U.S. Publ. No. 2004/0024134) were fed over a period of 310 min. The resulting latex had a solid content of 32% by weight and was coagulated with 450 g $MgCl_2$. The polymer was dried at 115° C. The polymer gum had an integrated absorbance ratio for the carbonyl-containing end groups of 0.055. The Mooney-Viscosity (1+10', 121° C.) was 90. The NMR analysis showed the following composition: 65.1 mole % TFE, 33.6 mole % PMVE, 1.06 mole % MV5CN and 0.15 mole % $CF_3$ end group.

Polymer Gum B preparable as follows: Under oxygen-free conditions, a 150 L kettle is charged with 105 L deionized water. To the kettle, 2000 g of APFO (30% aqueous solution), 350 kg of $K_2HPO_4$, and 112 g $C_4F_9SO_2Na$ is added. After heating to 71° C., 2020 g TFE, 6870 g PMVE and 59 g of bromo trifluoroethylene (BTFE) is added. The reaction is initiated with the addition of 750 g of an aqueous 10 wt (weight) % APS solution. At 16 bar pressure and 71° C., 22.1 kg TFE, 22.1 kg PMVE, and 0.33 kg BTFE are fed into the kettle over a period of about 400 min (6.6 hr). The resulting latex typically has a solid content of 27% by weight. 50 kg of the latex can be coagulated with 360 g $MgCl_2 6H_2O$ and dried at 110° C. The typically Mooney-Viscosity (1+10', 121° C.) is 90 and the polymer gum has the following composition: 55 wt % TFE, 44.2 wt % PMVE, and 0.8 wt % BTFE.

Polymer Gum C: Under oxygen-free conditions, a 150 L kettle was charged with 105 L deionized water. To the kettle, 520 g of $C_7F_{15}COONH_4$ (APFO) and 240 g $C_4F_9SO_2NH_4$ were added. After heating to 73° C., 1220 g TFE and 3570 g PMVE were added. $CF_2$=$CFOCF_2(CF_2)_3CF_2CN$ (122 g MV5CN) was added as preemulsion. The reaction was initiated with addition of 180 g APS dissolved in 1100 mL deionized water. At 10 bar pressure and 73° C., 24.5 kg TFE, 20.4 kg PMVE, and 1.7 kg MV5CN (as preemulsion) were fed into the kettle over a period of 300 min. The resulting latex had a solid content of 31% by weight and was coagulated with 450 g $MgCl_2$. The polymer was dried at 115° C. The gum had an integrated absorbance ratio for the carbonyl-containing end groups of 0.096. The Mooney-Viscosity (1+10', 121° C.) was 86. The NMR analysis showed the following composition: 66.2 mole % TFE, 32.5 mole % PMVE, 1.05 mole % MV5CN and 0.24 mole % $CF_3$ end group.

Unless otherwise mentioned, suitable starting materials and reagents for the preparation of the azido compound can be obtained from Sigma-Aldrich Corporation, St. Louis, Mo. The % yield is reported relative to the starting material.

Azide 1 $N_3CH_2CH_2OCH_2CHOHCH_2N_3$ (1-azido-3-(2-azidoethoxy)-2-propanol) was prepared by the same process steps as azide 2 except that 2-chloroethanol was used instead of methanol in step 1. A yellow liquid was obtained. Structural confirmation was achieved by FTIR spectroscopy.

Azide 2 $CH_3OCH_2CHOHCH_2N_3$ (1-azido-3-methoxy-2-propanol) was prepared as follows:

Step 1—1-chloro-3-methoxy-2-propanol: Methanol, (640 g), was mixed with $SnCl_4$ (10.6 g, 4.76 mL) in a 5 L, 3-necked flask and heated to 60° C. Epichlorohydrin (1480 g), was added at a rate to maintain the temperature in the range of 60° C.-75° C. After addition was complete, the reaction mixture was cooled to 25° C. and methylene chloride, (1000 g), was added. A pre-dissolved mixture of ethylenediamine tetraacetic acid disodium salt (43 g), sodium hydroxide (9.2 g), and water 1000 (g) was added and stirred for one hour, then allowed to separate overnight. The lower organic phase was freed of methylene chloride at atmospheric pressure, then the product was distilled using a water aspirator vacuum with pot temperature 82° C., head temperature 79° C. at 22 mmHg pressure. The recovered material was redistilled using a Vigreaux column at 16-18 mm Hg, pot temperature of 74-80° C. and head temperature of 70-71° C. Yield was 1403 g. Step 2-1-azido-3-methoxy-2-propanol: 1-chloro-3-methoxy-2-propanol, 200 g, was mixed with DMSO (200 g) and water (14 g), in a 2 L, 3-neck flask and heated towards 90° C. Sodium azide (200 g) was added gradually beginning at 50° C. and continued as heating proceeded to 90° C. The addition took 30 min and temp was at 90° C. when addition was complete. The reaction was allowed to run for 7.5 hrs. 1000 mL water was added and the mixture was stirred for 15 min then transferred to a reparatory funnel. It was convenient to let this sit overnight before separating. Methylene chloride (200 g) was added to the product phase and then 200 mL deionized water and the phases were separated. The organic phase was stirred for 30 min with 20 g anhydrous $NaSO_4$ then filtered into a 1000 mL 3-neck flask. The product was stripped using a water bath at 55° C., an aspirator, and a nitrogen purge for about 2 hours. The yield was 160 g of a yellow liquid. Structural confirmation was achieved by FTIR spectroscopy.

Azide 3 $CH_3OCH_2CH(OCONC_4H_9)CH_2N_3$ (1-azido-3-methoxy-2-propyl-N-n-butylurethane) was prepared by mixing 1-azido-3-methoxy-2-propanol (128 g) with dibutyltin dilaurate, (0.03 g), stirred and heated to 50° C. in a 250 mL, 3 neck flask under a nitrogen purge. n-Butylisocyanate (100 g, 11% excess) was then added over a period of 50 min and was allowed to react at 50° C. over a period of 95 hours. The reaction periodically was checked for completeness by IR and after 95 hours, the reaction appeared complete. The excess butylisocyanate was removed by vacuum distillation at 50° C. using a water aspirator. Yield was 197 g of a yellow liquid. Structural confirmation was achieved by FTIR spectroscopy.

Azide 4 $nC_4H_9NH$—$CO$—$OCH_2CH_2N_3$ was prepared by heating n-butylisocyanate (5 g, 50.5 mmol), $N_3$—$CH_2CH_2$—OH (4.8 g, 55.5 mmol), and dibutyltin dilaurate (15 mg) at 85°

C. for 1 hr in toluene (50 g). Excess $N_3$—$CH_2CH_2$—OH and toluene were removed by distillation on a rotary evaporator. Structural confirmation was achieved by FT-NMR and FTIR spectroscopy. Yield was greater than 95%.

Azide 5 $CH_3CH_2C(CH_2OCH_2CHOHCH_2N_3)_3$ was prepared as follows:

Step 1—$CH_3CH_2C(CH_2OCH_2CHOHCH_2Cl_3)_3$ was prepared by melting a mixture of trimethylolpropane (134 grams) and 1 gram of $C_6H_5CH(SO_2CF_3)_2$ (made by reacting benzyl magnesium chloride with triflyl fluoride according to *Journal of Organic Chemistry*, 38, p. 3358, 1973) in a flask equipped with stirring bar and dropping funnel. The temperature was controlled at 70' C while epichlorohydrin (277 g) was added over a period of two hours. Step 2—This tri-chloro compound (without purification) was converted to the tris-azide 5 by adding it over a period of one hour to a hot solution (100° C.) of sodium azide (200 g) and sodium hydroxide (5 g) in 500 grams of water. The mixture was stirred for 10 hours at 100° C., then allowed to cool. The aqueous phase was separated from the product phase and extracted with ethyl acetate (500 g). The ethyl acetate phase was combined with the product phase and residual water removed by azeotropic distillation. The dried product solution in ethyl acetate was filtered and the ethyl acetate was removed on the rotary evaporator. The product was a viscous yellow liquid. Structural confirmation was achieved by FTIR spectroscopy.

Azide 6 $N_3CH_2CH_2O[CH_2CH(CH_2N_3)O]_6H$ was prepared by the procedure used for Azide 1 except that the ratio of epichlorohydrin to 2-chloroethanol was 6:1 in the first step, the product was used in the second step without distillation, and xylene was used instead of methylene chloride in the second step. Structural confirmation was achieved by FTIR spectroscopy.

Azide 7 $CH_3CH_2C[CH_2(OCH_2CH(CH_2N_3))_2OCH_3]_3$ was prepared from Azide 6 by acetylation with acetic anhydride using pyridine as an acid trap. Structural confirmation was achieved by FTIR spectroscopy.

Azide 8 $N_3CH_2CH_2O$—CO—NH—$(CH_2)_6$—NH—CO—$OCH_2CH_2N_3$ was prepared analogously to azide 4 except that n-butylisocyanate was replaced with hexamethylene diisocyanate and the molar quantity of 2-azidoethanol was doubled. Structural confirmation was achieved by FT-NMR and FTIR spectroscopy. Yield was greater than 95%.

Azide 9 t-$C_4H_9NH$—CO—$OCH_2CH_2N_3$ was prepared analogously to azide 4 except that n-butylisocyanate was replaced with t-butylisocyanate. Structural confirmation was achieved by FT-NMR and FTIR spectroscopy. Yield was greater than 95%.

Azide 10 $nC_4H_9ND$-CO—$OCH_2CH_2N_3$ was prepared analogously to azide 4 except that $N_3$—$CH_2CH_2$—OH was replaced with $N_3$—$CH_2CH_2$—OD. Structural confirmation was achieved by FT-NMR and FTIR spectroscopy. Yield was greater than 95%.

Azide 11 $C_6H_5NH$—CO—$OCH_2CH_2N_3$ was prepared analogously to azide 4 except that the n-butylisocyanate was replaced with phenylisocyanate. Structural confirmation was achieved by FT-NMR and FTIR spectroscopy. Yield was greater than 95%.

Azide 12 $N_3$—$CH_2CH_2$—OH was prepared by adding 2-chloroethanol (80.5 g, 1 mol) dropwise over 30 min to a 70° C. stirred solution of sodium azide (66.95 g, 1.03 mol, American Azide Corp., Las Vegas, Nev.) in deionized water with 1% wt sodium hydroxide (EMD, Gibbstown, N.J.). The reaction was then heated at 100° C. for 5 hrs. 2-Azidoethanol was extracted from the reaction mixture with toluene (EMD, Gibbstown, N.J.) and dried via azeotropic distillation of toluene and water. The dried solution was filtered, then toluene was removed by distillation using a rotary evaporator. Structural confirmation was achieved by FT-NMR and FTIR spectroscopy. Yield was approximately 75%.

Azide 13 $C_4F_9$—O—$CF(CF_3)$—ND-CO—$OCH_2CH_2N_3$ was prepared by suspending sodium azide (18.85 g, 290 mmol) in dimethyl sulfoxide (DMSO, 100 g) with stirring. $C_4F_9$—O—$CF(CF_3)C(O)F$ (100 g, 262 mmol, 3M Co., St. Paul, Minn.) was dissolved in FC-40 (400 g, 3M Co., St. Paul, Minn.). The carbonyl fluoride solution was added dropwise over 22 min to the stirred suspension of sodium azide in DMSO. The reaction suspension was washed with deionized water to remove the DMSO, HF, and excess sodium azide, then dried over 4 Å molecular sieves, and finally washed with toluene (which formed a second, top phase), yielding the dry acyl azide in FC-40 as a bottom phase. The acyl azide in FC-40 then was heated at 100° C. for 3 hrs to give the corresponding isocyanate via the Curtius Rearrangement. The isocyanate was isolated from the FC-40 by distillation on a rotary evaporator. The neat isocyanate was reacted with $N_3$—$CH_2CH_2$—OD to form the urethane analogously to the procedure described for the synthesis of azide 4, using tetrahydrofuran (Alfa Aesar, Ward Hill, Mass.) as the solvent. Structural confirmation was achieved by FTIR spectroscopy.

Azide 14 $N_3CH_2CH_2N^+(CH_3)_3I^-$ was prepared by dissolving $N_3CH_2CH_2N(CH_3)_2$ (20 g, 175 mmol, prepared as below, Azide 15) in methanol (100 g, Alfa Aesar, Ward Hills, Mass.) with stirring. Methyl iodide (27.4 g, 193 mmol) was added to the stirred solution drop-wise over 10 min. The reaction was kept at 20° C. for the first 30 min using a cold water bath, then allowed to warm to room temperature and stirred for 18 hrs. Methanol and unreacted starting material were removed by distillation using a rotary evaporator. The yellow solid product was dried further in a vacuum oven. Yield was 80%.

Azide 15 $(CH_3)_2NCH_2CH_2N_3$ is available from 3M Co., St. Paul, Minn., as L-15686 or is preparable as described in by G. P. Schiemenz and H. Engelhard in *Chem. Ber.*, v. 92, p. 857-862, 1959.

Azide 16 $N_3$—$CH_2CH_2$—OD was prepared by stirring 2-azidoethanol (5 g) with $D_2O$ (10 g, Cambridge Isotope Laboratory, Andover, Mass.) for 20 min. Toluene (50 g) was added and the suspension was dried via azeotropic distillation with toluene. The toluene was removed by distillation on a rotary evaporator and the neat 2-azidoethanol was again reacted with $D_2O$, dried, and stripped of toluene, giving neat $N_3$—$CH_2CH_2$—OD. Structural confirmation was achieved by FT-NMR and FTIR spectroscopy. Yield was approximately 90%.

Azide 17 the reaction product of $CH_3CH_2C(CH_2OCH_2CHOHCH_2N_3)_3$ with $C_4F_9$—$OCF(CF_3)COF$ was prepared by dissolving Azide 5 (4.5 g) in 50 mL of dry tetrahydrofuran in a 100-mL flask and stirred using a magentic stirring bar. Then $C_4F_9$—$OCF(CF_3)COF$ (4.2 g, 3M Company, St. Paul, Minn.) was added in small portions over a period of 10 min. A mild exotherm was noted and all of the fluorinated material dissolved. The mixture was heated to 60° C. for an hour, cooled, then the solvent and the HF were removed by distillation.

Azide 20 (non-curing) $N_3(CH_2)_3OH$ was prepared analogously to azide 12 except that 3-chloropropanol was used instead of 2-chloroethanol. Structural confirmation was achieved by FT-NMR spectroscopy.

Azide 21 (non curing) $C_6H_5SO_3$—$CH_2CH_2N_3$ was prepared by dissolving 2-azidoethanol (3.9 g, 45 mmol) and 2,6-dimethylpyridine (4.9 g, 45 mmol) in toluene (25 g) with stirring. Benzenesulfonyl chloride (8 g, 45 mmol) was added drop-wise over 1 min. The reaction was left stirring for 2 days and then was washed with deionized water. The toluene was then removed by distillation using a rotary evaporator, yielding the neat product. Structural confirmation was achieved by FT-NMR spectroscopy.

The compositions for Examples 1 to 22 are listed in Table 1. The polymer, additive(s), and cure agent(s) were compounded together on a two-roll mill. Cure rheology of the compounded mixture was tested. Results are reported in Table 1.

TABLE 1

| Example No. | 1 | 2 | 3 | 4 | 5 | 6 | 7 | 8 | 9 | 10 | 11 |
|---|---|---|---|---|---|---|---|---|---|---|---|
| Azide used | 1 | 1 | 2 | 3 | 6 | 7 | 8 | 9 | 11 | 13 | 14 |
| Polymer Gum A (phr) | 100 | 100 | 100 | 100 | 100 | 100 | 100 | 100 | 100 | 100 | 100 |
| Aerosil (phr) | 3 | 3 | — | — | — | — | 1.5 | 1.5 | 1.5 | 1.5 | 1.5 |
| Carbon black (phr) | — | — | 30 | 30 | 30 | 30 | 30 | 30 | 30 | 30 | — |
| Azide amount (phr) | 1 | 1 | 1 | 1 | 1.5 | 1.5 | 1.5 | 1.5 | 1.5 | 1.5 | 1.5 |
| Temp (° C.) | 177 | 188 | 188 | 188 | 188 | 188 | 188 | 188 | 188 | 188 | 188 |
| $M_L$ (in lbs) | 0.95 | 0.68 | 1.07 | 0.69 | 1.14 | 1.28 | 1.89 | 0.82 | 0.95 | 0.99 | 0.46 |
| $M_H$ (in lbs) | 3.26 | 5.72 | 8.17 | 7.60 | 8.74 | 4.48 | 19.49 | 4.30 | 7.94 | 8.25 | 4.70 |
| ts2 (min) | 14.08 | 8.80 | 13.66 | 9.67 | 13.23 | 18.00 | 3.94 | 14.30 | 14.96 | 11.03 | 11.70 |
| t50 (min) | 11.42 | 9.84 | 17.48 | 13.97 | 18.80 | 21.00 | 7.56 | 13.00 | 19.01 | 14.26 | 12.10 |
| t90 (min) | 14.34 | 14.84 | 25.67 | 25.73 | 27.54 | 29.50 | 14.02 | 20.30 | 27.22 | 19.90 | 22.90 |

| Example No. | 12 | 13 | 14 | 15 | 16 | 17 | 18 | 19 | 20 | 21 | 22 |
|---|---|---|---|---|---|---|---|---|---|---|---|
| Azide used | 15 | 3 | 3 | 5 | 10 | 4 | 12 | 16 | 17 | 4 | 8 |
| Polymer Gum A (phr) | 100 | 100 | 100 | 100 | 100 | 100 | 100 | 100 | 100 | 100 | 100 |
| Aerosil (phr) | — | 1.5 | 1.5 | — | 1.5 | — | 1.5 | 1.5 | 1.5 | 1.5 | 1.5 |
| Carbon black (phr) | 30 | 30 | 30 | 30 | 15 | 15 | 30 | 30 | 30 | 25 | 25 |
| Azide amount (phr) | 1.5 | 1 | 1.5 | 1.5 | 1.5 | 1.5 | 1.5 | 1.5 | 1.5 | 1.5 | 1.5 |
| Temp (° C.) | 188 | n/m | 188 | 188 | 188 | 188 | 188 | 188 | 188 | n/m | n/m |
| $M_L$ (in lbs) | 1.00 | n/m | 1.08 | 1.63 | 0.76 | 0.94 | 0.98 | 1.26 | 0.86 | n/m | n/m |
| $M_H$ (in lbs) | 6.30 | n/m | 9.65 | 16.01 | 6.96 | 10.02 | 11.55 | 10.86 | 8.97 | n/m | n/m |
| ts2 (min) | 8.85 | n/m | 5.14 | 7.36 | 12.48 | 6.81 | 7.72 | 5.75 | 9.44 | n/m | n/m |
| t50 (min) | 11.25 | n/m | 8.09 | 14.39 | 15.89 | 10.88 | 11.55 | 8.65 | 15.00 | n/m | n/m |
| t90 (min) | 24.01 | n/m | 15.50 | 23.92 | 26.06 | 19.72 | 17.24 | 13.37 | 26.20 | n/m | n/m |

— indicates not added
n/m indicates not measured

The compositions for Examples 23 to 25 are listed in Table 2 below.

TABLE 2

| Example No. | 23 | 24 | 25 |
|---|---|---|---|
| Azide used | 16 | 12 | 12 |
| Polymer Gum (phr) | Gum C, 100 | Gum C, 100 | Gum A, 100 |
| Aerosil (phr) | 1.5 | 1.5 | 1.5 |
| Carbon black (phr) | 30 | 30 | 30 |
| Azide amount (phr) | 1.5 | 1.5 | 1.5 |
| Temp (° C.) | 188 | 188 | 188 |
| $M_L$ (in lbs) | 1.22 | 1.17 | 1.49 |
| $M_H$ (in lbs) | 13.3 | 9.03 | 11.4 |
| ts2 (min) | 14.2 | 4.92 | 6.01 |
| t50 (min) | 22.89 | 7.17 | 9.47 |
| t90 (min) | 43.45 | 11.61 | 15.10 |

The compositions for Comparative Examples CE-1 and CE-2 are listed in Table 3 below. The polymer, additive(s), and cure agent were compounded together on a two-roll mill. Cure rheology on the compounded mixture was tested. Results are reported in Table 3.

TABLE 3

| Example No | CE-1 | CE-2 |
|---|---|---|
| Azide used | 20 | 21 |
| Polymer Gum A (phr) | 100 | 100 |
| Aerosil (phr) | 1.5 | 1.5 |
| Carbon black (phr) | 30 | 30 |
| Azide amount (phr) | 1.5 | 1.5 |
| Temp (° C.) | 188 | 188 |
| $M_L$ (in lbs) | 1.06 | 1.35 |
| $M_H$ (in lbs) | 1.54 | 2.23 |
| t50 (min) | 3.72 | 5.57 |
| t90 (min) | 11.45 | 19.42 |

In Table 3, no ts2 value is given because Comparative Examples CE-1 and CE-2 did not show an increase in torque of 2 units above $M_L$.

The compositions for Comparative Examples CE-3 and CE-4 are listed in Table 4 below. The polymer, additive(s), and cure agent were compounded together on a two roll mill. The cure rheology of the compounded mixture was tested. The results are reported in Table 4.

TABLE 4

| Example No. | CE-3 | CE-4 |
|---|---|---|
| Polymer Gum Type and Amount (phr) | Gum A 100 | Gum B 100 |
| Adipate (phr) | 0.75 | — |
| TAS (phr) | 1 | — |
| Hydrotalcite (phr) | 0.5 | — |
| Aerosil (phr) | 1.5 | — |
| Carbon black (phr) | 8 | 30 |
| ZnO (phr) | — | 5 |
| TAIC (phr) | 1.5 | 2.5 |
| Peroxide (phr) | 0.9 | 1.5 |
| Temp (° C.) | 177 | 177 |
| $M_L$ (in lbs) | 1.32 | 3.09 |
| $M_H$ (in lbs) | 12.52 | 25.02 |
| ts2 (min) | 0.92 | 0.53 |

TABLE 4-continued

| Example No. | CE-3 | CE-4 |
|---|---|---|
| t50 (min) | 1.53 | 0.86 |
| t90(min) | 4.95 | 2.17 |

— indicates not added

Shown in Table 5 is the chemical resistance and thermal stability of the azido-cured samples. The compounded compositions were first molded into O-rings or coupons, then were press cured for 25 min at 188° C. followed by a stepped post cure. The post cure procedure was conducted in a nitrogen environment as follows: ramp from room temperature to 200° C. in 45 min, hold for 2 hr at 200° C., ramp from 200° C. to 250° C. in 30 min, hold for 2 hr at 250° C., ramp from 250° C. to 300° C. in 30 min, hold for 4 hr at 300° C. The molded samples were then cooled to room temperature over 2 hrs. Examples 15 and 17 in Table 5 below were post cured in both a nitrogen or air environment. In these Examples, the numbers marked with an asterisk (*) were samples that were post-cured in air following the same post cure procedure described above except a nitrogen environment was not used, while the unmarked numbers were post-cured in a nitrogen environment as described above. In Table 5, the numbers in parenthesis are the number of replicates tested and the number preceding the parenthesis is the reported average of the replicates.

TABLE 5

| Example No. | 15 | 17 | 20 | 21 | 23 | 23 | 25 | 25 |
|---|---|---|---|---|---|---|---|---|
| Sample type | O-ring | O-ring | O-ring | O-ring | O-ring | Coupon | O-ring | Coupon |
| Compression Set | 68*/61 | 51*/54 | n/m | n/m | 57 | n/m | 60 (2) | n/m |
| Water Resistance | 79.9*/24.3 | 26.8*/7.4 | n/m | n/m | 177.0 | 164.0 | n/m | 36.5 |
| Steam Resistance | n/m | n/m | n/m | n/m | + | n/m | n/m | 59.8 |
| Ethylene Diamine Resistance | n/m | n/m | 36.3 | 43.2 | 44.2 | 59.9 | n/m | 43.7 | n/m indicates not measured
+ Note:
sample melted during the testing

Comparative Example CE-3 compositions were first molded into O-rings, then were press cured for 7 min at 177° C. followed by a post cure in nitrogen for 16 hrs at 175° C. Comparative Example CE-4 compositions were first molded into O-rings, then were press cured for 10 min at 177° C. followed by a post cure in air for 16 hrs at 232° C. Comparative Example CE-5 is an O-ring sold under the trade designation "KALREZ SPECTRUM 6375" from Dupont Performance Elastomers, Wilmington, Del. Dimensions of the O-ring were 25 mm internal diameter with a 3.53 mm cross sectional area. Comparative Example CE-6 was prepared as follows. 100 phr of perfluoroelastomer gum sold under the trade designation "TECNOFLON PFR 95" was compounded on a two-roll mill with 1.5 phr Varox DBPH-50, 5 phr zinc oxide (USP1 grade) and 30 phr of MT N-990 carbon black obtained from Cabot Corp., Alpharetta, Ga. The samples were molded into O-rings with a 25 mm internal diameter with a 3.53 mm cross sectional area. The O-rings were pressed cured for 10 min at 176° C. (350° F.) and post-cured for 16 hr at 232° C. (450° F.) in air. Shown in Table 6 is the chemical resistance and thermal stability of the non azido-cured samples. In Table 6, numbers in parenthesis are the number of replicates tested. The number preceding the parenthesis is the reported average of the replicates.

TABLE 6

| Sample No. | CE-3 | CE-4 | CE-5 | CE-6 |
|---|---|---|---|---|
| Sample type | O-ring | O-ring | O-ring | O-ring |
| Compression Set | 81 (4) | 112 (2) ++ | 89 (3) | 113 (3) |
| Water Resistance | 5.1 (3) | 13.9 (3) | −0.8 | 5.2 |
| Steam Resistance | −2.4 (2) | 2.0 (2) | −2.2 | −0.7 |
| Ethylene Diamine Resistance | 16.8 (3) | 38.0 (3) ** | 6.1 | 48.1 |

++ CE-4 actually melted during the compression set testing (i.e., became deformed and had to be scraped from the test fixture using a razor blade). One compression set test was run on the melted O-ring.
** CE-4 also blistered during the ethylene diamine testing.

As shown in Table 5, some of the examples showed a compression set resistance of less than 75% at 300° C. for 70 hours, a resistance to water of less than 50% volume swell in 168 hours at 230° C., and a resistance to ethylene diamine of less than 45% volume swell in 168 hours at 100° C. While all of the comparative examples showed poor high temperature resistance evidenced by the high compression set at 300° C.

Foreseeable modifications and alterations of this invention will be apparent to those skilled in the art without departing from the scope and spirit of this invention. This invention should not be restricted to the embodiments that are set forth in this application for illustrative purposes.

What is claimed is:
1. A composition comprising:
   a. a fluoropolymer having a nitrile-containing cure site; and
   b. a curing agent, wherein the curing agent is an azide selected from: i) a mono azide with at least one functional group in a beta position, ii) a polyazide, or iii) combinations thereof.
2. A composition according to claim 1 wherein the curing agent is at least one of: $N_3CH_2CH_2OCH_2CHOHCH_2N_3$, $CH_3OCH_2CHOHCH_2N_3$, $CH_3OCH_2CH(OCONHC_4H_9)CH_2N_3$, $CH_3CH_2C(CH_2OCH_2CHOHCH_2N_3)_3$, $N_3CH_2CH_2O[CH_2CH(CH_2N_3)O]_6H$, $CH_3CH_2C[CH_2(OCH_2CH(CH_2N_3))_2OH]_3$, $CH_3CH_2C[CH_2(OCH_2CH(CH_2N_3))_2OCOCH_3]_3$, $N_3CH_2CH_2OCONH(CH_2)_6NHCOOCH_2CH_2N_3$, $(CH_3)_3CNHCOOCH_2CH_2N_3$, $C_4H_9NDCOOCH_2CH_2N_3$, $C_6H_5NHCOOCH_2CH_2N_3$, $C_4F_9OCFCF_3NDCOOCH_2CH_2N_3$, $DOCH_2CH_2N_3$, $HOCH_2CH_2N_3$, $(CH_3)_2NCH_2CH_2N_3$, and $[(CH_3)_3NCH_2CH_2N_3]^+I^-$.

3. A composition according to claim 1, wherein the fluoropolymer is a partially fluorinated plastic, a perfluoroplastic, a partially fluorinated elastomer, a perfluoroelastomer, or combinations thereof.

4. A composition according to claim 1, wherein the cure site is derived from at least one of the following cure-site monomers: $CF_2=CFO(CF_2)_LCN$, $CF_2=CFO[CF_2CF(CF_3)O]_q(CF_2)_yOCF(CF_3)CN$, and $CF_2=CF[OCF_2CF(CF_3)O]_rO(CF_2)_tCN$ where L is 2 to 12, q is 0 to 4, y is 0 to 6, r is 1 to 2, and t is 1 to 4.

5. A composition according to claim 1, wherein the fluoropolymer is comprised of a monomer of perfluoromethyl vinyl ether and tetrafluoroethylene.

6. A composition according to claim 1, wherein the fluoropolymer has an integrated absorbance ratio of carbonyl-containing end groups of less than 0.08.

7. A composition according to claim 1, wherein the fluoropolymer has an integrated absorbance ratio of carbonyl-containing end groups of less than 0.06.

8. A composition according to claim 1, wherein the fluoropolymer has an integrated absorbance ratio of carbonyl-containing end groups of less than 0.025.

9. A method of curing a composition comprising curing a fluoropolymer having a nitrile-containing cure site in the presence of a curing agent as described in claim 1.

10. A composition according to claim 1 wherein the azide is selected from:
i) $UOCR_2CR_2N_3$
wherein U is H, D, or a urethane ($-CO-NR_2$) and R is independently H, D, or an organic group;
ii) $R'_2NCR_2CR_2N_3$ or $A\text{-}R'_3N^+CR_2CR_2N_3$
wherein R' is an organic group and A is an anion;
iii) $G(N_3)_m$
wherein m is an integer from 2 to about 10 and G is a m-valent organic group wherein at least two of the azido groups are connected via aliphatic carbon atoms wherein G may contain organic groups; or
iv) combinations thereof, which may contain both nitrogen connected and oxygen connected beta-position groups, or any combination of azides i), ii), and iii).

11. A composition according to claim 10, wherein the azide is polyfunctional.

12. A composition according to claim 10, wherein the azide of selected from i) or ii) is monofunctional.

13. A composition according to claim 1, further comprising an additional curative, and optionally a coagent.

14. A composition according to claim 13, wherein the additional curative is at least one of: a triazine-forming cure, a peroxide cure, and an aminophenol cure.

15. A composition according to claim 1, further comprising a filler, wherein the filler is at least one of an organic filler or inorganic filler.

16. A composition according to claim 15, wherein the filler is at least one of silica, carbon black, and a mineral filler.

17. An article prepared by curing the composition of claim 1.

18. An article according to claim 17, wherein the article is at least one of an O-ring, a gasket, tubing, or a seal.

* * * * *

UNITED STATES PATENT AND TRADEMARK OFFICE
CERTIFICATE OF CORRECTION

PATENT NO. : 8,288,005 B2
APPLICATION NO. : 13/056135
DATED : October 16, 2012
INVENTOR(S) : Anthony Peter Manzara et al.

It is certified that error appears in the above-identified patent and that said Letters Patent is hereby corrected as shown below:

Title Page, Col. 2 (Other Publications)
Lines 9-12, delete "Darkow, ............ 195-207" and insert the same on First Page, Col. 2, Line 10, below "3470." as a new entry

Column 1
Line 37, delete "fluoroonium" and insert -- fluoronium --

Column 4
Line 10, delete "to" and insert -- to: --

Line 51 (approx.), delete "$CF_2=CFO[CF_2)_q(CFZ)_uO]_nR_f$" and insert -- $CF_2=CFO[(CF_2)_q(CFZ)_uO]_nR_f$ --

Line 59 (approx.), delete "$CF_2=CFO[CF_2CF(CF_3)O]_g(CF_2)_k(OCF_2)_p]C_xF_{2x+1}$" and insert -- $CF_2=CFO[(CF_2CF(CF_3)O)_g(CF_2)_k(OCF_2)_p]C_xF_{2x+1}$ --

Column 7
Line 49, delete "bis-amidooximes" and insert -- bis-amidoximes --

Column 11
Line 19 (approx.), delete "Parsipanny," and insert -- Parsippany, --

Line 55, delete "$MgCl_26H_20$" and insert -- $MgCl_26H_2O$ --

Column 12
Line 34, delete "Vigreaux" and insert -- Vigreux --

Line 44, delete "reparatory" and insert -- separatory --

Signed and Sealed this
Twenty-sixth Day of February, 2013

Teresa Stanek Rea
*Acting Director of the United States Patent and Trademark Office*

Column 13
Line 13, delete "70' C" and insert -- 70° C --

Column 20
Line 18 (approx.), in claim 12, delete "of selected" and insert -- is selected --